(12) United States Patent
Hirota et al.

(10) Patent No.: US 11,338,954 B2
(45) Date of Patent: May 24, 2022

(54) ALUMINUM CAN

(71) Applicants: TOYO SEIKAN CO., LTD., Tokyo (JP); TOYO SEIKAN GROUP HOLDINGS, LTD., Tokyo (JP)

(72) Inventors: Norihisa Hirota, Yokohama (JP); Ryozo Shiroishi, Yokohama (JP); Takuho Kumagai, Yokohama (JP); Kenichi Takao, Yokohama (JP)

(73) Assignees: TOYO SEIKAN CO., LTD., Tokyo (JP); TOYO SEIKAN GROUP HOLDINGS, LTD., Tokyo (JP)

( * ) Notice: Subject to any disclaimer, the term of this patent is extended or adjusted under 35 U.S.C. 154(b) by 14 days.

(21) Appl. No.: 16/344,612

(22) PCT Filed: Oct. 20, 2017

(86) PCT No.: PCT/JP2017/038007
§ 371 (c)(1),
(2) Date: Apr. 24, 2019

(87) PCT Pub. No.: WO2018/079434
PCT Pub. Date: May 3, 2018

(65) Prior Publication Data
US 2020/0071017 A1    Mar. 5, 2020

(30) Foreign Application Priority Data
Oct. 25, 2016 (JP) .............................. JP2016-208532
Oct. 25, 2016 (JP) .............................. JP2016-208533

(51) Int. Cl.
*B65D 1/16* (2006.01)
*B65D 1/40* (2006.01)
(Continued)

(52) U.S. Cl.
CPC ............. *B65D 1/165* (2013.01); *B21D 22/28* (2013.01); *B21D 51/26* (2013.01); *B65D 1/40* (2013.01)

(58) Field of Classification Search
CPC .................................. B65D 1/165; B65D 1/40
USPC ........................................................ 428/687
See application file for complete search history.

(56) References Cited

U.S. PATENT DOCUMENTS

| 8,647,729 B2 | 2/2014 | Kanazawa et al. |
| 2013/0205862 A1 | 8/2013 | Takahashi et al. |

FOREIGN PATENT DOCUMENTS

| CN | 104136362 A | 11/2014 |
| EP | 2 444 245 A1 | 4/2012 |

(Continued)

OTHER PUBLICATIONS

Imazu et al., JPH 09253772 A machine translation, Sep. 30, 1997, entire machine translation (Year: 1997).*

(Continued)

*Primary Examiner* — Humera N. Sheikh
*Assistant Examiner* — Katherine A Christy
(74) *Attorney, Agent, or Firm* — Sughrue Mion, PLLC

(57) ABSTRACT

An aluminum can wherein, when the light reflected by the outer surface of the body portion of the aluminum can is evaluated based on the LCH method by using a multi-angle spectral colorimeter, the aluminum can features a ratio $C_{15h}/C_{15w}$ of 0.6 to 1.4, the ratio $C_{15h}/C_{15w}$ being that of a saturation value $C_{15h}$ of the light reflected at 15 degrees in the direction of height and a saturation value $C_{15w}$ of the light reflected at an angle 15 of degrees in the circumferential direction based on the light regularly reflected from the light that is incident at 45 degrees in the direction of height and in the circumferential direction.

7 Claims, 4 Drawing Sheets

(51) Int. Cl.
*B21D 22/28* (2006.01)
*B21D 51/26* (2006.01)

(56) References Cited

FOREIGN PATENT DOCUMENTS

| | | | |
|---|---|---|---|
| EP | 2444245 B1 * | 12/2015 | ............ B32B 15/20 |
| JP | 44-9811 B | 5/1969 | |
| JP | 8-119285 A | 5/1996 | |
| JP | 9-253772 A | 9/1997 | |
| JP | H 09253772 A * | 9/1997 | |
| JP | 2002-327150 A | 11/2002 | |
| JP | 3440688 B2 | 8/2003 | |
| JP | 2013-163187 A | 8/2013 | |
| JP | 5609036 B2 | 10/2014 | |
| KR | 2014-0003540 U | 6/2014 | |

OTHER PUBLICATIONS

Communication dated Sep. 7, 2020 from the Japanese Patent Office in Application No. 2016-208532.
Communication dated Feb. 3, 2020, from the State Intellectual Property Office of the P.R.C in application No. 201780066405.7.
International Search Report for PCT/JP2017/038007 dated Jan. 23, 2018 [PCT/ISA/210].
Communication dated May 8, 2020 from European Patent Office in EP Application No. 17864316.9.
Communication dated May 25, 2020 from Japanese Patent Office in JP Application No. 2016-208532.

* cited by examiner

ALUMINUM CAN

CROSS REFERENCE TO RELATED APPLICATIONS

This application is a National Stage of International Application No. PCT/JP2017/038007 filed Oct. 20, 2017, claiming priority based on Japanese Patent Application Nos. 2016-208532 filed Oct. 25, 2016 and 2016-208533 filed Oct. 25, 2016.

TECHNICAL FIELD

This invention relates to an aluminum can. More specifically, the invention relates to an aluminum can obtained through the draw-ironing work under a dry condition.

BACKGROUND ART

As the aluminum cans widely used as beverage cans, there have been proposed resin-coated aluminum cans made from an aluminum sheet coated with a resin such as polyester resin like polyethylene terephthalate, by subjecting the aluminum sheet to the draw-ironing work under a dry condition without using a coolant (mixed solution of water and lubricating oil) (see, for example, patent documents 1 and 2).

The resin-coated aluminum cans of this kind, however, have their outer surfaces coated with a resin and, therefore, have almost no brilliancy.

Further, in the case of an aluminum can produced by directly draw-ironing an aluminum sheet under a wet condition using a coolant, a better metallic luster can be exhibited than that of the resin-coated cans. However, since the aluminum sheet is worked in a mixed lubricated region where the coolant is made present on the surface of the aluminum sheet being worked, brilliancy inherent in the aluminum which is the blank material cannot be expressed to a sufficient degree.

As described above, the conventional aluminum cans obtained by draw-ironing the aluminum sheet could not almost produce brilliant appearance either when they were draw-ironed under the dry condition or when they were draw-ironed under the wet condition. Or even if brilliancy was exhibited, the degree of brilliance was not sufficient depending on the direction in which it was looked at.

PRIOR ART DOCUMENTS

Patent Documents

Patent document 1: Japanese Patent No. 3440688
Patent document 2: Japanese Patent No. 5609036

OUTLINE OF THE INVENTION

Problems that the Invention is to Solve

The object of the present invention is to provide an aluminum can that is obtained through the draw-ironing work under a dry condition and that has an excellently brilliant appearance.

Means for Solving the Problems

The present inventors have forwarded the study concerning the brilliancy of the aluminum cans. That is, the inventors have provided an ironing die having a diamond film formed on the working surface thereof, and have smoothed the surface by polishing the surface of the diamond film on the die. By using the die, the inventors have produced an aluminum can by draw-ironing an aluminum sheet having an outer surface that has not been coated with any resin without using any coolant. As a result, the inventors have discovered that the aluminum can expressed a more brilliant appearance than that of the conventional aluminum cans, and have thus completed the invention.

According to the present invention, there is provided an aluminum can wherein, when a light reflected by the outer surface of the body portion of the aluminum can is evaluated based on the LCH method by using a multi-angle spectral colorimeter, the aluminum can features a ratio $C_{15h}/C_{15w}$ of 0.6 to 1.4, the ratio $C_{15h}/C_{15w}$ being that of a saturation value $C_{15h}$ of the light reflected at 15 degrees in the direction of height and a saturation value $C_{15w}$ of the light reflected at 15 degrees in the circumferential direction based on the light regularly reflected from the light that is incident at 45 degrees in the direction of height and in the circumferential direction.

More preferably, the aluminum can of the invention features that:

(1) The saturation value $C_{15h}$ of the light reflected at 15 degrees in the direction of height is not less than 8;
(2) A ratio $C_{25h}/C_{25w}$ is 0.6 to 1.4, the ratio $C_{25h}/C_{25w}$ being that of a saturation value $C_{25h}$ of the light reflected at 25 degrees in the direction of height and a saturation value $C_{25w}$ of the light reflected at 25 degrees in the circumferential direction;
(3) A lightness value $L_{15h}$ of the light reflected at 15 degrees in the direction of height and a lightness value $L_{15w}$ of the light reflected at 15 degrees in the circumferential direction are both not more than 75; and
(4) The lightness value $L_{15h}$ of the light reflected at 15 degrees in the direction of height is not more than 50.

Moreover, the aluminum can of the present invention has excellent smoothness, specifically, in a non-lubrication system that uses quite no lubricant, and features that:

(5) A maximum height of roughness Rz1 in the circumferential direction is not more than 0.5 μm on the outer surface of the thinnest portion of the body portion; and
(6) As viewed on the side surface, a ratio Ra1/Ra2 is 0.8 to 1.2, the ratio Ra1/Ra2 being that of a mean surface roughness Ra1 in the circumferential direction on the outer surface of the thinnest portion of the body portion and a mean surface roughness Ra2 in the circumferential direction on the outer surface of the lower end portion of the body portion.

Namely, according to the present invention, there is, further, provided an aluminum can that has a maximum height of roughness Rz1 in the circumferential direction of not more than 0.5 μm on the outer surface of the thinnest portion of the body portion and, as viewed on the side surface, has a ratio Ra1/Ra2 in a range of 0.8 to 1.2, the ratio Ra1/Ra2 being that of a mean surface roughness Ra1 in the circumferential direction on the outer surface of the thinnest portion of the body portion and a mean surface roughness Ra2 in the circumferential direction on the outer surface of the lower end portion of the body portion.

Effects of the Invention

When the aluminum can of the present invention is evaluated for its light reflected by the outer surface of the body portion thereof by the LCH method by using the multi-angle spectral colorimeter, the C-value that represents the saturation (vividness) is little different from either the measured value ($C_h$) of the light reflected in the direction of height of the body portion (axial direction of the can) or the measured value ($C_w$) of the light reflected in the circumferential direction of the body portion. That is, the aluminum can of the invention is less anisotropic in its brilliancy and, therefore, exhibits a high degree of brilliancy maintaining stability.

Besides, according to the present invention, the aluminum can is produced through the ironing work based on the dry forming without using any coolant in the step of production. Therefore, no washing step is required for removing the coolant and no chemical is required, either, offering a very great advantage from the industrial point of view.

Moreover, as will be understood from the above-mentioned brilliancy, the aluminum can of the invention also has excellent smoothness and exhibits, for example, a maximum height of surface roughness Rz1 which is as very small as not more than 0.5 μm in the circumferential direction on the outer surface of the thinnest portion of the body portion. That is, the outer surface of the aluminum can of the invention has been coated with no resin, and effectively suppresses the surface roughness that takes place during the working. As a result, the aluminum can exhibits an excellent metallic luster (brilliancy) free of anisotropy. Accordingly, the aluminum cans can be placed in the market featuring very high commercial values since they have been subjected to the after-treatment such as necking work following the draw-ironing work.

Of the aluminum cans of the present invention, furthermore, particularly preferred cans have such an excellent smoothness that the maximum height of surface roughness Rz1 is not more than 0.5 μm and, besides, have a ratio (Ra1/Ra2) of the mean surface roughness of 0.8 to 1.2, which is close to 1. Namely, the aluminum cans of the invention have a smooth surface at either the thinnest portion of the body portion or the lower end portion exhibiting, therefore, excellent brilliancy over the whole outer surface thereof.

MODES FOR CARRYING OUT THE INVENTION

Figure 1:
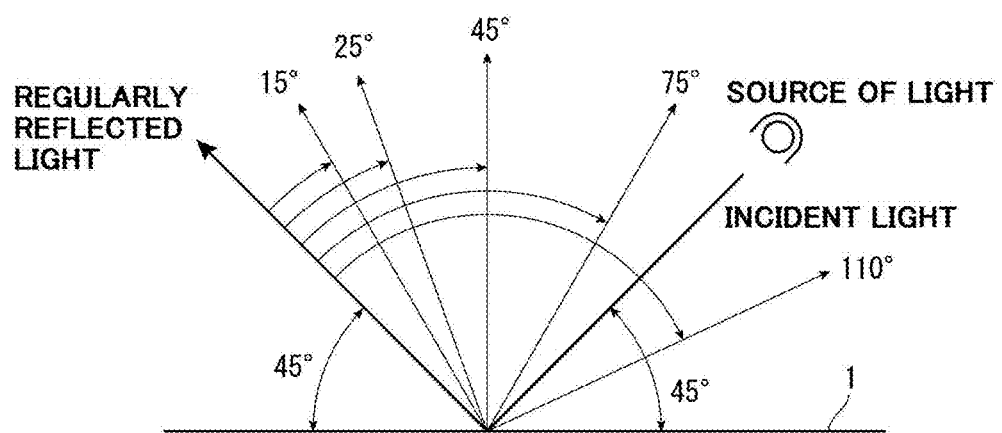
FIG. 1 is a diagram illustrating the principle for evaluating the reflected light by using a multi-angle spectral colorimeter.

Described below with reference to FIG. 1 is the principle of a multi-angle spectral colorimeter that is used for evaluating the brilliancy possessed by the aluminum can of the present invention.

In FIG. 1, the light is regularly reflected from the light (incident light) that incident in a direction of 45 degrees on the surface of a predetermined base plate 1 (corresponds to the outer surface of the aluminum can). Namely, the light is reflected in the direction of 45 degrees relative to the surface of the base plate 1 and is axially symmetrical to the incident light with respect to a perpendicular to the surface of the base plate 1. The larger the amount of the regularly reflected light, the less the amount of the scattering light caused by irregular reflection, accounting for an increased degree of luster. Usually, however, it is difficult to measure and determine the amount of the regularly reflected light. As shown in FIG. 1, therefore, measurement is taken of the light components reflected in the directions of 15 degrees, 25 degrees, 45 degrees, 75 degrees and 110 degrees from the regularly reflected light in order to evaluate the appearances such as color (saturation) and luster.

By using a multi-angle spectral colorimeter, the aluminum can of the invention can be measured for its C-value (saturation) by the LCH method relying on the light reflected at an angle of 15 degrees from the regularly reflected light and on the light reflected at an angle of 25 degrees therefrom. From the above measured value, it will be learned that the aluminum can of the invention exhibits very excellent brilliancy.

Further, when measured for its L-value (lightness) on the outer surface by the above LCH method, the measured values prove that the aluminum can of the invention exhibits a very excellent metallic luster. That is, owing to its excellent metallic luster compounded by the above-mentioned brilliancy, the aluminum can of the present invention exhibits a distinguished brilliancy that cannot be quite seen with the conventional aluminum cans.

Known methods of displaying color space include an L*a*b* method (also called Lab method) and an LCH method, the L*a*b* method displaying the color space in Cartesian coordinates (rectangular coordinates) while the LCH method representing the color space in polar coordinates.

According to the LCH method, a color is displayed by L, C and h which have the following meanings.

The letter L represents the lightness (brightness), i.e., darkness as the numeral approaches 0 and brightness as the numeral approaches 100.

The letter C represents the saturation (vividness) or a degree the numeral is away from the center axis. The smaller the value, the more turbid the color is and the larger the value, the more vivid the color is.

Of the above two numerical values, the C-value (saturation) represents the vividness. The larger the value, the more excellent the brilliancy is. Further, the smaller the difference between the C-value measured in the direction of height of the can and the C-value measured in the circumferential direction thereof, the less the anisotropy in the brilliancy that is appearing. In this case, the aluminum can exhibits homogeneous brilliancy irrespective of from which direction it is looked at. Further, the L-value (lightness) represents the brightness. The smaller the value, the more the brightness is emphasized by the regularly reflected light. Namely, the aluminum can exhibits improved metallic luster and further improved brilliancy.

On the other hand, the letter h represents an angle of hue, and is a value over a range of 0 to 360. It can be red, orange or yellow in a range of 0 to 90, yellow, yellowish green or green in a range of 90 to 180, green, cyan (bluish green) or blue in a range of 180 to 270, and blue, violet or magenta in a range of 260 to 360.

The aluminum can of the present invention is made from an aluminum sheet that is coated with no resin on at least the outer surface thereof, and is produced by ironing the aluminum sheet by using an ironing die that has a specific diamond film formed on the working surface thereof. The aluminum can exhibits distinct brilliancy that cannot be seen with the conventional aluminum cans.

That is, when the aluminum can is measured for a C-value of light reflected at a predetermined angle from the light regularly reflected by the outer surface of the body portion thereof by the LCH method by using the multi-angle colorimeter, the aluminum can shows a ratio $C_{15h}/C_{15w}$ of as high as 0.6 to 1.4 and, specifically, 0.8 to 1.0, the ratio $C_{15h}/C_{15w}$ being that of a C-value (i.e., $C_{15h}$) of the light reflected at an angle of 15 degrees from the regularly reflected light in the direction of height of the can (axial direction of the can) and a C-value (i.e., $C_{15w}$) of the light reflected at an angle of 15 degrees from the regularly reflected light in the circumferential direction of the can (i.e., in the direction at right angles with the direction of height). This means that the aluminum can has a very small anisotropy in the brilliancy.

That is, when a general consumer holds the can by his or her hand and looks at it, the angular range of view for the regularly reflected light is about 15 degrees to about 25 degrees. This tells that whenever the ratio $C_{15h}/C_{15w}$ lies within the above range, the degree of brilliancy remains the same irrespective of from which direction the can is looked at, i.e., excellent appearance can be seen.

With the conventional aluminum cans, for instance, the light reflected at large angles from the regularly reflected light or the light reflected at, for example, not less than 70 degrees makes both the C-value ($C_h$) in the direction of height and the C-value ($C_w$) in the circumferential direction small; i.e., there is almost no anisotropy in the C-value. This is because very little light is reflected at angles in excess of 45 degrees from the regularly reflected light. In a region where the angles are as small as 15 to 25 degrees relative to the regularly reflected light, however, a large proportion of light reflects. In the region where the large proportion of light reflects, the ratio $C_h/C_w$ of the C-value ($C_h$) in the direction of height and the C-value ($C_w$) in the circumferential direction becomes considerably smaller than 0.6 with the conventional aluminum cans, and anisotropy increases in the brilliancy. That is, anisotropy of brilliance increases at angles at which a person looks at the can. Therefore, the conventional aluminum cans are not capable of exhibiting satisfactory brilliancy.

The aluminum can of the present invention features a large ratio $C_{15h}/C_{15w}$ which is close to 1. The aluminum can also exhibits a large C-value ($C_{15}$) for the light reflected at an angle of 15 degrees from the regularly reflected light, as a matter of course. Namely, the aluminum can exhibits a high degree of brilliancy and features a $C_{15h}$-value of not less than 8 and, specifically, not less than 10 for the light reflected at 15 degrees from the regularly reflected light in the direction of height.

As described above, the aluminum can of the present invention has a small anisotropy of brilliance in the direction in which a person looks at the can by holding it by hand. Therefore, the ratio $C_{25h}/C_{25w}$ of the $C_{25h}$-value of the light reflected at 25 degrees in the direction of height and the $C_{25w}$-value of the light reflected at 25 degrees in the circumferential direction, too, becomes close to 1, e.g., 0.6 to 1.4 and, specifically, 0.7 to 1.0.

Moreover, the aluminum can of the present invention exhibits a high degree of metallic luster. For instance, a small value is assumed by either a lightness $L_{15h}$ of the light reflected at 15 degrees in the direction of height or a lightness $L_{15w}$ of the light reflected at 15 degrees in the circumferential direction. Namely, referring to FIG. 1, the light reflected in the direction of 15 degrees is located at a position close to the regularly reflected light. In case the aluminum can has a poor metallic luster, the component of scattered light is much present due to irregular reflection, and the value increases. In case the aluminum can has a high degree of metallic luster, however, the value decreases.

In the case of the aluminum can of the present invention, the $L_{15h}$-value and the $L_{15w}$-value vary depending on the surface of the aluminum blank used for the forming work. For instance, when a film is formed on the surface by the anodic oxidation or the conversion treatment, the $L_{15h}$-value and the $L_{15w}$-value are both not more than 75 and are, specifically, in a range of 60 to 70. When no oxide film is formed on the surface, both of these values are not more than 60 and, specifically, in a range of 35 to 55, and a higher degree of metallic luster is realized.

According to the LCH method as described earlier, a hue angle h serves as a parameter for representing color. Here, however, since the material forming the outer surface of the can is aluminum, the value of hue angle h is the same as that of the conventional aluminum cans and there is no difference.

The aluminum can of the present invention excels in its high level of brilliancy and, in this connection, has a highly smooth outer surface. The smoothness will be described later.

<How to Produce the Aluminum Can>

According to the present invention, the aluminum can is produced by forming an aluminum sheet.

The aluminum sheet that is to be subjected to the forming work may be pure aluminum or an alloy of aluminum and other metal, such as an aluminum alloy containing magnesium or manganese.

Further, in order to impart excellent brilliancy to the outer surface of the aluminum can according to the present invention, it is important that no resin has been applied onto the surface of the aluminum sheet at least on the outer surface side of the can. If the aluminum sheet with its outer surface being coated with the resin is subjected to the forming work, then the metallic luster possessed by the aluminum is impaired.

Therefore, so far as the surface on the outer surface side of the can has not been coated with the resin, the aluminum sheet may be coated with the resin or may, for example, be laminated with a thermoplastic resin film such as of a polyester resin as represented by polyethylene terephthalate on the surface that becomes the inner surface side of the can. This helps improve corrosion resistance and like properties of the inner surface of the can.

Further, the aluminum sheet may have a film formed on the surface thereof by the anodic oxidation or conversion treatment. If it is attempted to obtain a highly improved metallic luster, however, it is desired that the blank aluminum material has no film formed thereon but has its surface exposed. As described earlier, when the aluminum sheet having no film formed on the surface thereof is formed into the aluminum can, the $L_{15h}$-value and the $L_{15w}$-value become smaller than those values of the aluminum can that has the film formed on the surface thereof; i.e., more excellent metallic luster is exhibited. This is presumably due to that when the aluminum sheet having the film formed on the surface thereof is subjected to a severe forming work that will be described later, hard oxide particles formed on the surface are split off during the forming work (specifically, during the ironing work). Namely, the oxide particles cause the surface to be roughened to some extent accounting for a decrease in the metallic luster on the surface. When no film is formed on the surface, on the other hand, no oxide particle cause the surface to be roughened accounting for the expression of a higher degree of metallic luster.

Figure 2A:
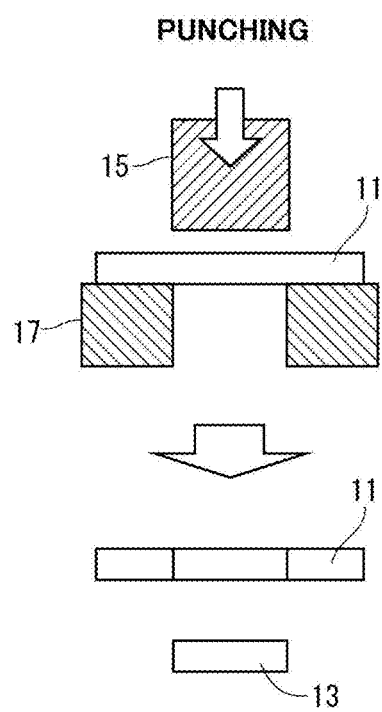
FIGS. 2A and 2B are views schematically illustrating the steps of punching work and drawing work for producing an aluminum can of the present invention.
Figure 2B:
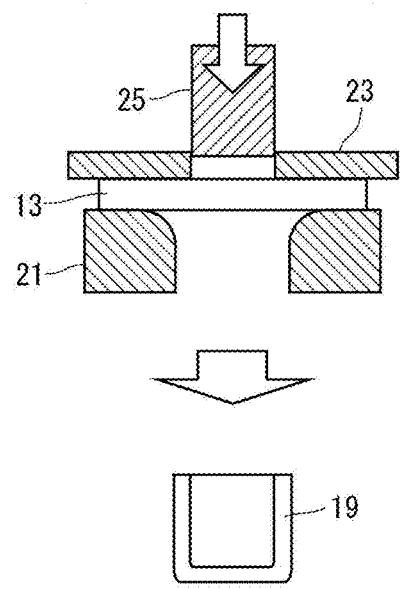
Figure 3:
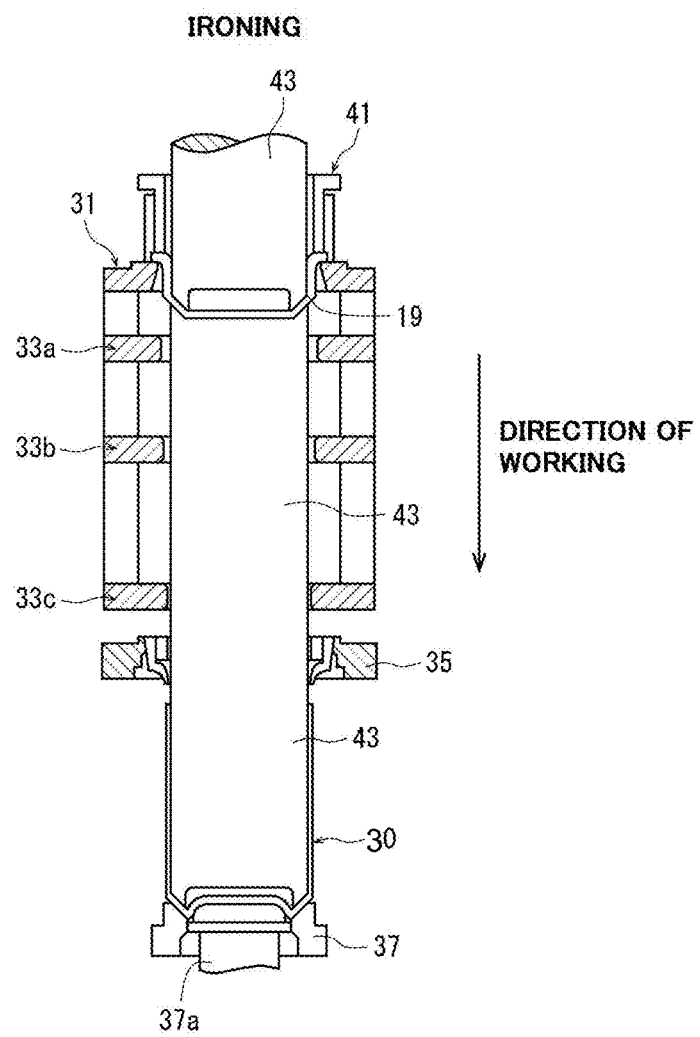
FIG. 3 is a view schematically illustrating the step of ironing work that is executed after the step of drawing work of FIGS. 2A and 2B.

The aluminum sheet is subjected to the forming work which includes a punching work, a drawing work, and a redraw-ironing work. FIGS. 2A and 2B are views schematically illustrating the punching work and the drawing work in the step of forming work, and FIG. 3 is a view schematically illustrating the redraw-ironing work.

Referring to FIGS. 2A and 2B, a blank sheet 11 comprising the above-mentioned blank aluminum material (which may have been coated with the resin on the side that becomes the inner surface of the can) is, first, subjected to the punching work to obtain a disk (blank) 13 for forming a can (see FIG. 2A).

The punching work is carried out by using an ironing punch 15 that has an outer diameter corresponding to the diameter of the disk 13 and a die 17 that holds the blank 11 and that has an opening corresponding to the diameter of the disk 13. Namely, the disk 13 of a predetermined size is obtained as the blank 11 held on the die 17 is punched by the punch 15.

The disk 13 obtained as above is subjected to the drawing work to thereby obtain a draw-formed can of a small height (bottomed cylinder) 19 (see FIG. 2B).

In the drawing work, the disk 13 that is punched is held on the die 21 while the circumference of the disk 13 is held by a blank holder 23. The die 21 has an opening formed therein, and the disk 13 is pushed into the opening of the die 21 by using a drawing punch 25 to thereby obtain a draw-formed can 19.

The corner portion at the upper end of the opening of the die 21 (on the side on where the disk 13 is held) has been rounded (curved) so that the disk 13 can be quickly pushed into the opening of the die 21 without being folded. The punch 25 has an outer diameter which is smaller than the diameter of the opening of the die 21 just by an amount nearly corresponding to the thickness of the disk 13. Namely, in this drawing work, the thickness is not almost reduced.

Next, the draw-formed can 19 obtained above is subjected to the redraw-ironing work shown in FIG. 3 to thereby form a base body of aluminum can (blank can) 30 having a large height and a small diameter.

In the step of redraw-ironing work shown in FIG. 3, there are arranged a redraw die 31 and a plurality of ironing dies 33a to 33c, each having the shape of a ring, and in order mentioned. Further, a guide ring 35 is arranged on the downstream of the ironing die 33c which is located on the most downstream side in the direction of working. On further the downstream, there are arranged a holder ring 37 and a holder rod 37a in order mentioned to form the bottom portion.

The ironing dies 33a to 33c have diameters that decrease from the die 33a toward the die 33c (toward the downstream in the direction of working) so that the thickness is gradually reduced.

To execute the redraw-ironing work, the draw-formed can 19 is held on the redraw die 31 by using a holder 41. In this state, an ironing punch 43 is inserted in the draw-formed can 19 and is moved in the direction of working causing the outer surface of the draw-formed can 19 to be press-contacted to the inner surfaces (working surfaces) of the dies 31 and 33a to 33c, whereby the redraw-ironing work is executed, and the thickness of the side wall of the draw-formed can 19 is reduced. There is thus obtained the blank can 30 having a thickness that is reduced and a height that is increased depending on the degree of reduction in the thickness.

The ironing punch 43 has an end portion that is tapered to become narrow to meet the bottom 3 of the blank can 10. Further, the holder ring 37 is allowed to slide in the direction of working. The holder rod 37a is inserted in the center of the ring 37. The inner circumferential surface of the holder ring 37 and the upper end of the holder rod 37a are defining a shape that corresponds to the bottom of the blank can 30.

That is, the draw-formed can 19 is pushed out by the ironing punch 43 through the above-mentioned dies 31 and 33a to 33c. Moreover, the bottom of the draw-formed can 19 after ironing-worked is pushed onto the holder ring 37 and the holder rod 37a. The draw-formed can 19 after ironing-worked is thus imparted with a predetermined bottom shape, and the blank can 30 is obtained. After the blank can 30 is formed as described above, the ironing punch 43 moves toward the upstream side in the direction of working. The blank can 10 that is obtained is held by the guide ring 35, and the ironing punch 43 is removed therefrom. The blank can 30 is then taken out.

The blank can 30 is then subjected to the after-treatments such as trimming, necking and wrap-seaming, and is used as an aluminum can. Here, the outer surface of the blank can 30 possesses brilliancy and smoothness like those of the aluminum cans that are to be placed in the market.

In the above-mentioned step of ironing work, there are arranged, in FIG. 3, three ironing dies to execute the ironing work in three stages. In the invention, however, the number of the ironing dies is not limited to three only but can be any number depending on a desired degree of reduction in the thickness and the height of the can. Namely, the ironing work can be executed through a single stage using a single die or through a plurality of stages by arranging the dies in a number of two or more. Here, as described above already, when the ironing work is to be executed through a multiplicity of stages by arranging the ironing dies in a plural number in the direction of working, the inner diameters (working diameters) thereof gradually decrease toward the downstream in the direction of working, as a matter of course.

For instance, the above-mentioned ironing work is executed by using a suitable number of the ironing dies that have suitable diameters such that the ironing ratio defined by the following formula becomes, usually, not more than 50%.

Ironing ratio (%)=(amount of ironing work/thickness before ironing work)×100

To obtain the aluminum can of the invention, it is necessary that the above ironing work is executed under a dry condition without using coolant. It is, further, necessary that the ironing dies 33a to 33c have their working surfaces (surfaces that come in contact with the outer surface of the draw-formed can 19 that is to be ironed) provided with a diamond film whose surface has been polished to assume a high degree of smoothness. Even when the ironing work is to be executed by arranging the dies in a number other than three, it is necessary, as a matter of course, that each die has the diamond film formed on the working surface thereof.

The ironing work under the dry condition can be executed based on either a dry-lubrication system using a lubricant or a dry-non-lubrication system using quite no lubricant. In order to obtain the aluminum can having specifically excellent brilliancy, however, it is most desired to execute the ironing work based on the dry-non-lubrication system.

In the ironing work based on the dry-lubrication system that uses the lubricant, the forming is executed by applying a known solid lubricant (e.g., paraffin wax, etc.) on the surface of the blank sheet 11 or the disk 13 in advance but without using coolant.

Through the ironing work (preferably, dry-non-lubrication system) under the dry condition by using the ironing dies provided with the above-mentioned diamond film, it is made possible to express excellent brilliancy on the outer surface of the blank can 30 that is obtained. Concerning the saturation, for example, the blank can 30 has a ratio $C_{15h}/C_{15w}$ in a range of 0.6 to 1.4 and, specifically, 0.8 to 1.0 on the outer surface of the body portion thereof, and has a small anisotropy in the brilliance. Further, the blank can 30 has a ratio $C_{25h}/C_{25w}$ in a range of 0.6 to 1.4, specifically, 0.7 to 1.0. Concerning the lightness, the blank can 30 has an $L_{15h}$-value and an $L_{15w}$-value which are both not more than 50.

When the coolant is used, for example, then the ironing work is executed in a state where the coolant is made present between the to-be-worked surface (outer surface of the draw-formed can 19 that is to be ironed) and the working surfaces of the ironing dies 33a to 33c. In this case, the working surfaces of the ironing dies 33 are not brought into direct contact with the to-be-worked surface and, therefore, the metallic luster cannot be improved to a sufficient degree on the surface being worked. In order to obtain the aluminum can of the present invention, therefore, it becomes necessary to execute the ironing work by bringing the working surfaces of the dies into direct contact with the to-be-worked surface under the dry condition without using coolant.

If executed under the dry condition without using coolant, however, the ironing work could become a very severe work since a large surface pressure is applied. Besides, upon executing the work under the dry condition, there develops a defective forming with the use of the dies made of an ordinary rigid material. Therefore, it becomes necessary to use the ironing dies 33a to 33c provided with the diamond film on their working surfaces.

Moreover, the diamond film is a hard film and is capable of withstanding the severe ironing work under the dry condition. However, if the diamond film is used for executing the ironing work under the dry condition without polishing the surface thereof, the body of the can is broken in most of the cases and the forming cannot be continued until the final shape is accomplished. This is because the to-be-worked surface (corresponds to the outer surface of the can) comes into direct contact with the surface of the film with a large surface pressure. In case the surface of the film is rough, therefore, it is considered that the frictional force becomes so large that a large load is exerted on the material. Moreover, even in case the forming could be done, the brilliancy can no longer be expressed. This is because since the to-be-worked surface (corresponds to the outer surface of the can) is similarly brought into direct contact with the surface of the film with a large surface pressure, the surface state of the film is reflected on the to-be-worked surface. For example, the roughness of the to-be-worked surface differs greatly depending on the direction of working (corresponds to the direction of height of the can) and the direction at right angles with the direction of working (circumferential direction of the can). As a result, the ratio of the $C_{15h}$-value and the $C_{15w}$-value of the obtained aluminum can becomes smaller than 0.6, vividness varies depending on the viewing direction and satisfactory brilliancy is not realized. It is, therefore, necessary to polish the surface of the diamond film so that the surface assumes a high degree of smoothness from the standpoint of decreasing the anisotropy in the vividness and metallic luster and expressing the feeling of excellent brilliancy and metallic luster.

In the invention, the above-mentioned diamond film is, usually, provided on at least the working surfaces of the ironing dies 33a to 33c made of a rigid base material that are used. Here, as the rigid base material, there is used a material having a rigidity large enough to withstand the severe ironing work that involves a high surface pressure and also having a heat resistance capable of withstanding the heating of a high temperature at the time of forming the diamond film.

The above material can be a so-called cemented alloy obtained by sintering a mixture of, for example, tungsten carbide (WC) and a metal binder such as cobalt, or a cermet obtained by sintering a mixture of a metal carbide such as titanium carbide (TiC) or a titanium compound such as titanium carbonitride (TiCN) and a metal binder such as nickel or cobalt, or hard ceramics such as silicon carbide (SiC), silicon nitride ($Si_3N_4$), alumina ($Al_2O_3$) or zirconia ($ZrO_2$).

There is no specific limitation on the diamond film that is formed on the working surfaces of the dies for ironing work (ironing dies) made of the above rigid base material. It is, however, desired that the diamond film has an intensity ratio represented by the following formula (1):

$$I_D/I_G \quad (1)$$

wherein, $I_D$ is a maximum peak intensity at $1333\pm10$ $cm^{-1}$ in the Raman spectrometry of the surface of the carbon film, and $I_G$ is a maximum peak intensity at $1500\pm100$ $cm^{-1}$ in the Raman spectrometry of the surface of the carbon film, of not less than 1.0 and, preferably, in a range of not less than 1.2.

That is, the peak intensity $I_D$ is due to the diamond component in the film while the peak intensity $I_G$ is due to the graphite component in the film. Therefore, the larger the peak intensity ratio, the smaller is the content of the graphite, indicating that the film is almost composed of the diamond crystals (diamond film of a high purity).

The diamond film of this kind has a Vickers' hardness which is as very high as not less than 8000 and a high degree of chemical stability suppressing the reaction with the material to be worked on the interface thereof. This provides a favorable slipperiness and, therefore, a very high degree of resistance against the severe ironing work under the dry condition. If the intensity ratio is less than the above-mentioned ratio, it means that the diamond film contains much components other than the diamond component, i.e., contains graphite and the like. In this case, the diamond film has less slipperiness, decreased resistance against the ironing work and, therefore, may cause much defective forming.

Here, however, if the peak intensity ratio is too large, then the film may become brittle and lose durability. It is, therefore, desired that the peak intensity ratio is not more than 5.

The diamond film having the above-mentioned peak intensity ratio is formed on the surface of the rigid base material 31 by a known plasma CVD method such as hot filament CVD method, microwave plasma CVD, or high-frequency plasma CVD.

The film is formed by using, as the starting gas, a gas that is obtained by diluting, usually, a hydrocarbon gas such as methane, ethane, propane or acetylene with a hydrogen gas to a concentration of about 1%. The starting gas is often mixed with a gas such as oxygen, carbon monoxide or carbon dioxide in small amounts to adjust the quality of the film and the rate of forming the film.

Namely, the film is formed by using the above starting gas, heating the rigid base material at a temperature of as high as 700 to 1000° C., generating a plasma by using microwaves or high-frequency waves, decomposing the starting gas to generate active species in the plasma, and growing the crystals of diamond on the rigid base material. In forming the film, the graphite and amorphous carbon formed on the rigid base material are selectively etched with the hydrogen atoms dissociated in the plasma. The film, therefore, contains much diamond component and exhibits a peak intensity ratio in the Raman spectroscopy that lies within the range mentioned above.

In the invention, the diamond film formed as described above is polished on its surface.

The diamond film formed by such means as vapor deposition has a rough surface. Specifically, the diamond film having the above-mentioned peak ratio is accompanied by the etching with graphite or amorphous carbon during when it is formed. Accordingly, the diamond crystals tend to easily grow causing the surface to become rough. Therefore, it becomes necessary to polish the surface of the diamond film to render the surface to be smooth.

To obtain the aluminum can having an outer surface that exhibits excellent brilliance as described above, for example, the surface is so polished as to assume a surface roughness Ra (JIS B-0601-1994) of not more than 0.1 μm and, specifically, not more than 0.05 μm.

The surface of the diamond film can be polished by a method known per se.

For example, the surface may be mechanically polished by using abrasive grains of diamond (grindstone) which also grinds the carbon film or by utilizing the chemical action. Or the surface may be polished by using these mechanical and chemical methods in combination.

The aluminum can of the invention having the outer surface that features excellent brilliancy can be obtained through the ironing work under the dry condition by using the ironing dies 33 that have, on the working surfaces thereof, the diamond film that has the smooth surface as described above.

In addition to exhibiting excellent brilliancy, the aluminum can of the present invention obtained by the above method requires neither the chemicals nor the washing facility for removing coolant since it is produced by the ironing work under the dry condition. Therefore, the present invention is very advantageous from the standpoint of production cost, too.

As will also be understood from its excellent brilliancy, the outer surface of the aluminum can of the present invention obtained as described above features a very high degree of smoothness. The smoothness will now be explained with reference to FIG. 4.

Figure 4:
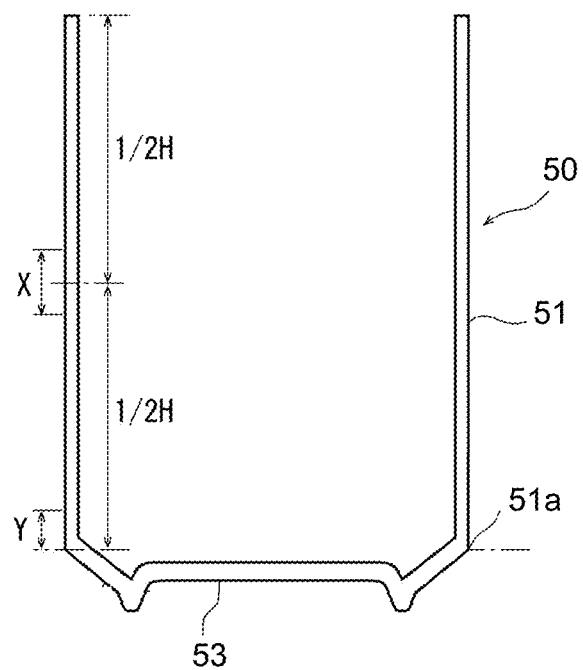
FIG. 4 is a sectional side view schematically illustrating the aluminum can of the present invention.

FIG. 4 illustrates a draw-ironed blank can (hereinafter simply referred to as blank can) obtained through the ironing work based on the non-lubrication system using quite no lubricant despite of under the dry condition described above. That is, the smoothness of the outer surface of the blank can is quite comparable to the smoothness of the outer surfaces of the aluminum cans obtained through a predetermined after-treatment.

In FIG. 4, the blank can generally designated at 50 is a formed body prior to being subjected to the after-treatment such as necking work, and has a very simple shape.

Referring to FIG. 4, the blank can 50 has a bottomed cylindrical shape as a whole, and comprises a straight body portion 51 extending downward from an upper end thereof and a bottom portion 53 continuous to the lower end of the body portion 51.

The blank can 50 has not been coated with the resin on at least the outer surface thereof, and has a maximum height of surface roughness Rz1 (JIS-B-0601-2001) of not more than 0.5 μm in the circumferential direction on the outer surface of the thinnest portion X of the body portion 51. This means that the surface roughness is suppressed during the ironing work, and a high degree of metallic luster is expressed due to the smooth outer surface.

Here, the thinnest portion X of the body portion stands for a region where the thickness is equivalent to the smallest thickness ±5 μm of the body portion 51.

When the blank sheet coated with no resin is subjected to the draw-ironing work under the wet condition, an oil film enters into the interface between the ironing dies and the aluminum surface. Therefore, the working surface of the ironing die is transferred less to the blank can, the surface is roughened, and the metallic luster is lost. However, when the ironing work is executed by using the die having, on the working surface thereof, the diamond film that has been smoothed as described above, the frictional coefficient is very small between the diamond film that has been smoothed and the aluminum surface. Therefore, the slipperiness is greatly improved between the working surface of the ironing die and the aluminum surface. Under the dry condition, therefore, it is made possible to execute the ironing work based on the lubrication system using the lubricant in a very decreased amount or to execute the ironing work based on the non-lubrication system without using the lubricant at all. As a result, the surface roughness can be effectively suppressed, the maximum height of surface roughness Rz1 assumes a small value as described above in the circumferential direction in the thinnest portion X of the body portion, and the outer surface expresses a high degree of metallic luster.

For instance, in the case of the ironing work under the wet condition by using the ironing die of an ordinary cemented carbide having no diamond film formed on the working surface thereof, the maximum height of surface roughness Rz1 assumes a large value in the circumferential direction due to the surface roughness, and the metallic luster is deteriorated.

Further, when the above-mentioned ironing work is executed under the wet condition by using the coolant (mixture of water and a lubricant such as wax), the maximum height of surface roughness Rz1 in the circumferential direction increase at the thinnest portion X of the body portion. Therefore, the ironing work becomes little different from the ironing work that is executed under the wet condition by using the ironing dies made of an ordinary cemented carbide.

That is, under the wet condition, the ironing work is executed in a state where a lubricating film (coolant) is made present between the working surface of the ironing die and the surface of the metal, and the metallic luster of the material cannot be withdrawn to a sufficient degree.

When the ironing work is executed by using the ironing die that has the above-mentioned smoothed diamond film formed on the working surface thereof, however, the die exhibits a high degree of slipperiness to the surface of the metal and, besides, the hard diamond film comes into direct contact with the surface of the metal with a large surface pressure. Therefore, the surface of the metal is more effectively smoothed, the maximum height of surface roughness Rz1 in the circumferential direction assumes a lower value, and more improved metallic luster is expressed than those of when the lubricating film is made present.

As described above, the outer surface of the blank can 50 (i.e., outer surface of the aluminum can of the invention) exhibits excellent metallic luster.

Figure 5A:
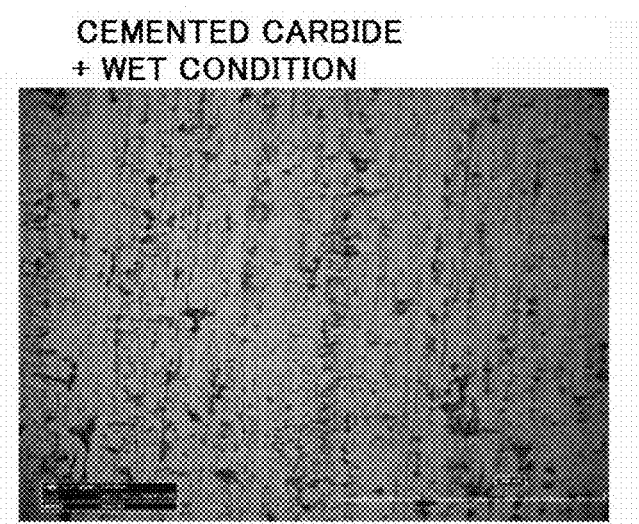
FIGS. 5A, 5B and 5C are views of microphotographs (magnification of 700) showing outer surfaces of aluminum cans (blank cans) obtained through the ironing work by using ironing dies, FIG. 5A showing the outer surface of a blank can obtained through the forming work under a wet condition by using the ironing dies made of a cemented carbide, FIG. 5B showing the outer surface of a blank can obtained under a dry condition (lubrication system) by using the ironing dies having a smoothed diamond film formed on the working surfaces thereof, and FIG. 5C showing the outer surface of a blank can obtained under a dry condition (non-lubrication system) by using by using the ironing dies having a smoothed diamond film formed on the working surfaces thereof.
Figure 5B:
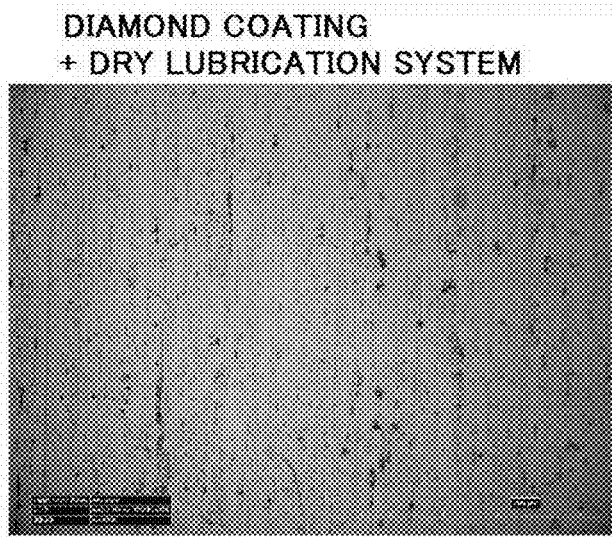
Figure 5C:
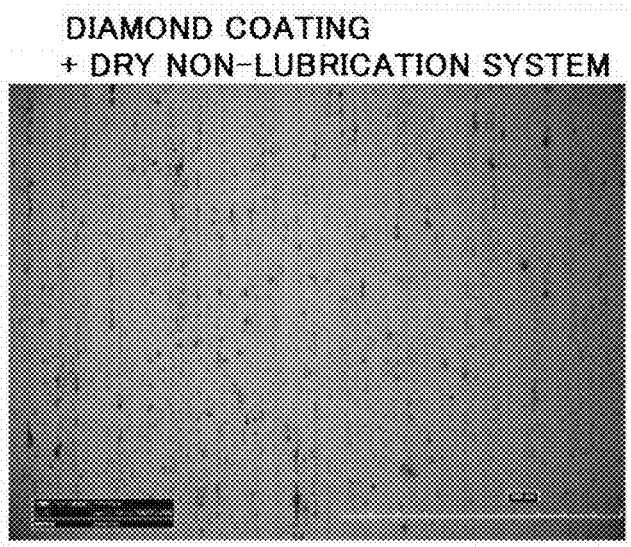

For instance, FIGS. 5A, 5B and 5C show microphotographs (magnification of 700) of the outer surfaces of blank cans obtained through the ironing work under the dry condition by using the ironing dies having the smoothed diamond film formed on the working surfaces thereof.

FIG. 5A shows the outer surface of a blank can obtained through the forming work under the wet condition by using the ironing dies made of a cemented carbide, FIG. 5B shows the outer surface of a blank can obtained under the dry condition (lubrication system) by using the ironing dies having a smoothed diamond film formed on the working surfaces thereof, and FIG. 5C shows the outer surface of a blank can obtained under the dry condition (non-lubrication system) by using the ironing dies having a smoothed diamond film formed on the working surfaces thereof.

As shown, surface roughness has been effectively suppressed on the outer surfaces of the blank cans 50 that are obtained through the ironing work under the dry condition in accordance with the present invention.

Of the blank cans 50 of FIG. 4, further, specifically those obtained through the ironing work under the dry condition based on the non-lubrication system feature a ratio (Ra1/Ra2) in a range of 0.8 to 1.2, which is close to 1, the ratio (Ra1/Ra2) being that of a mean surface roughness Ra1 in the circumferential direction at the thinnest portion X of the body portion and a mean surface roughness Ra2 in the circumferential direction at the lower end portion Y of the body portion.

Here, as shown in FIG. 4, the lower end portion Y of the body portion is a region between the lower end 51a of the body portion and a portion 3 mm higher than the lower end 51a of the body portion.

According to the study conducted by the present inventors, when the ironing work is executed under the wet condition by using the coolant or based on the lubrication system under the dry condition but using a solid lubricant, it has been confirmed that the lower part of the obtained blank can is not sufficiently smoothed and, specifically, the region from the lower end portion Y to the bottom portion 53 of the body portion 51 is not sufficiently smoothed despite of using the ironing dies having the above-mentioned smoothed diamond film. Namely, it has been confirmed that the mean surface roughness Ra2 in the circumferential direction at the lower end portion Y becomes considerably greater than the mean surface roughness Ra1 in the circumferential direction at the thinnest portion X of the body portion. This is because in the ironing work, the lubricant is brought into the interface between the ironing die and the material depending on a change in the pressure due to the working, in order to achieve the necessary lubrication. In the initial stage of the ironing work, however, there takes place a sharp change in the pressure in addition to an impact load caused by the contact of the dies with the material whereby more lubricant is brought in. Accordingly, the surface of the mold is less transferred onto the blank can, and the surface is less smoothed near the lower end 51a of the body portion 51. By using the ironing die having the above-mentioned diamond film on the working surface thereof and, at the same time, by executing the ironing work based on the non-lubrication system under the dry condition, therefore, the surfaces can be reliably smoothed at the bottom portion and at the lower end portion Y of the body portion without being hindered by the lubricant. Therefore, the lower end portion Y of the body portion, too, acquires the mean surface roughness Ra2 of a value which is as small as that of the thinnest portion X of the body portion accounting for that the surface roughness ratio (Ra1/Ra2) assumes a value close to 1.

As described above, the surface roughness ratio (Ra1/Ra2) that assumes a value close to 1 means that a high degree of metallic luster is expressed by either the thinnest portion X of the body portion or the lower end portion Y of the body portion and, accordingly, that excellent metallic luster is homogeneously expressed over the whole body portion 51.

As will also be understood from the smoothness on the outer surface of the blank can 50, the aluminum can of the present invention has a very high commercial value since it exhibits its metallic luster to a maximum of degree.

EXAMPLES

The invention will now be described by using the following Examples.

[Ironing Dies]

A mixture of tungsten carbide (WC) and cobalt working as a metal binder was sintered to obtain a cemented carbide. The surface of the cemented carbide (base material) was then coated with a carbon film by the hot filament CVD method to obtain an ironing die.

[Measuring the Surface Roughness]

By using a surface roughness meter manufactured by Tokyo Seimitsu Co., Ltd. (Surfcom 2000SD3), an arithmetic mean roughness Ra and a maximum height of surface roughness Rz were measured in compliance with the JIS-B-0601.

[Evaluation]

By using a multi-angle spectral colorimeter (manufactured by Videojet X-Rite K. K.), the light reflected by the outer surface of the body portion of the aluminum can was evaluated based on the LCH method. Based on the light regularly reflected from the light incident at 45 degrees in the direction of height and in the circumferential direction, the ratios $C_{15h}/C_{15w}$ and $C_{25h}/C_{25w}$ were found at respective angles, the values $C_{15h}$ and $C_{25h}$ being those representing the saturation (vividness) with the light reflected at 15 degrees and 25 degrees in the direction of height and the values $C_{15w}$ and $C_{25w}$ being those representing the saturation (vividness)

with the light reflected at 15 degrees and 25 degrees in the circumferential direction. The aluminum cans were confirmed for their appearance or brilliancy with the eyes.

Similarly, further, there were found a value $L_{15h}$ representing the lightness of the light reflected at 15 degrees in the direction of height and a value $L_{15w}$ representing the lightness of the light reflected at 15 degrees in the circumferential direction. The aluminum cans were confirmed for their appearance or metallic luster with the eyes. The appearance was thus totally evaluated inclusive of the above-mentioned brilliance.

Example 1

An aluminum sheet (material A3104) of a thickness of 0.27 mm was not treated on its surface on the outer surface side (side to be ironing worked) but was treated with chromic phosphate on the inner surface side thereof and on which was, further, laminated a 12 μm-thick polyester resin. The thus obtained aluminum sheet was used as a sheet material for producing an aluminum can.

First, by using a general-purpose press, the sheet material was punched into a circular shape which, at the same time, was drawn to form a bottomed cylindrical body of a diameter of φ95 mm (first cup).

Next, the bottomed cylindrical body was transferred to a press dedicated to forming a can body and where a punch having an outer diameter of about φ66 mm was moved at a maximum speed of 6 m/s to execute the redrawing work (drawing ratio of 70%) and the ironing work (at a maximum ironing ratio of 40%) under the dry condition (non-lubrication system) three times followed by trimming. There was thus obtained an aluminum can having a can body diameter of 66 mm and a height of 130 mm.

Here, the surfaces of the tools used for the redrawing work and the ironing work had been coated with a carbon film and had also been so polished that the surface roughness Ra of the forming portions was not more than 0.05 μm.

The aluminum can was evaluated by using the multi-angle spectral colorimeter, and was confirmed with the eyes for its appearance or brilliancy and appearance (overall evaluation) stemming from its brilliancy and metallic luster.

The results were as shown in Table 1.

Example 2

An aluminum sheet (material A3104) of a thickness of 0.27 mm was treated with chromic phosphate on both the outer surface side (side to be ironing worked) and inner surface side. The aluminum sheet was then laminated with a 12 μm-thick polyester resin on the inner surface side only. The thus obtained laminated sheet was used as a sheet material for producing an aluminum can. The aluminum can was produced in the same manner as in Example 1 but using the above sheet material, and was evaluated and confirmed.

The results were as shown in Table 1.

Comparative Example 1

An aluminum sheet (material A3104) of a thickness of 0.29 mm that has not been treated on either the outer surface side (side to be ironing worked) or the inner surface side was used as a sheet material for producing an aluminum can. The surfaces of the tools used for the redrawing work and the ironing work were polished without being coated with the carbon film. An aluminum can was produced, evaluated and confirmed in the same manner as in Example 1 but forming the sheet material under the wet environment while injecting a coolant to the material and to the tools in the press dedicated to forming the can body.

The results were as shown in Table 1.

Comparative Example 2

An aluminum sheet (material A3104) of a thickness of 0.27 mm was treated with chromic phosphate on both the outer surface side (side to be ironing worked) and inner surface side. The aluminum sheet was then laminated with a 10 μm-thick polyester resin on the outer surface side and with a 12 μm-thick polyester resin on the inner surface side. The thus obtained laminated sheet was used as a sheet material for producing an aluminum can. The aluminum can was produced in the same manner as in Example 1 but using the above sheet material, and was evaluated and confirmed.

The results were as shown in Table 1.

TABLE 1

| | $C_{15h}$ $C_{15w}$ | $C_{15h}/C_{15w}$ | $C_{25h}$ $C_{25w}$ | $C_{25h}/C_{25w}$ | Brilliancy | $L_{15h}$ | $L_{15w}$ | Overall evaluation |
|---|---|---|---|---|---|---|---|---|
| Example 1 | 8.91 11.31 | 0.87 | 8.59 11.00 | 0.78 | Good | 38.52 | 51.83 | Very good |
| Example 2 | 15.52 16.97 | 0.91 | 12.96 14.50 | 0.89 | Very good | 62.93 | 69.30 | Good |
| Comparative Example 1 | 7.62 15.73 | 0.48 | 6.99 12.38 | 0.56 | Average | 62.83 | 81.60 | Average |
| Comparative Example 2 | 5.66 3.93 | 1.44 | 5.00 1.83 | 1.42 | Bad | 126.24 | 126.4 | Bad |

APPLIED EXPERIMENTAL EXAMPLES

The Experimental Examples are to find the effects of the ironing work conditions upon the smoothness of the draw-ironed aluminum blank cans that are obtained.

Experimental Example 1

The aluminum sheets were ironing worked under the three conditions of using the ironing dies made of the cemented carbide+coolant lubrication (wet condition), diamond-coated dies+solid lubricant (dry lubrication system), and diamond-coated dies+no lubrication (dry non-lubrication system).

The aluminum sheets were made from the material A3104 that was rolled to a thickness of 0.27 mm. The aluminum sheet was punched and drawn to form a bottomed cylindrical body of a diameter of φ95 mm which was then used for the forming test.

The forming test consisted of using a hydraulic press, moving a punch of an outer diameter of φ66 mm at a speed of 1 m/s, executing, first, the drawing work to form a cylindrical body of a diameter of ϕ66 mm and in this state, executing the ironing work three times under the above-mentioned conditions. A maximum height of surface roughness Rz1 on the outer circumference at the thinnest portion X of the body portion was as shown in Table 2.

In the dry lubrication system using the solid lubricant, the aluminum sheet was formed by applying a paraffin wax as the solid lubricant onto the surface of the aluminum sheet.

TABLE 2

| No. | Dies | Lubricating condition | Surface roughness Rz | Visual results |
|---|---|---|---|---|
| 1 | cemented carbide | coolant (wet condition) | 0.57 μm | Average |
| 2 | cemented carbide | solid lubricant (dry lubrication system) | — | Bad (body portion broken) |
| 3 | coated with diamond | solid lubricant (dry lubrication system) | 0.36 μm | Good |
| 4 | coated with diamond | no lubricant (dry non-lubrication system) | 0.36 μm | Very good |

Table 2 tells that the surface roughness was smaller under the dry condition than under the wet condition. Further, when the ironing work was executed under the dry condition by using ironing dies made of the cemented carbide and the solid lubricant, the cylindrical body was broken and could not be formed. They were in agreement with the enlarged-scale photographs of the outer surfaces of the blank cans shown in FIGS. 5A, 5B and 5C and with the visual results. That is, the smaller the amount of the lubricant used for the forming work, the higher the transfer ratio of the surfaces of the dies onto the blank cans, and a high degree of smoothness (i.e., metallic luster) can be realized.

Experimental Example 2

Table 3 below shows in comparison the surface roughness at the thinnest portions of the body portions and at the lower end portions of the body portions.

TABLE 3

| No. | Dies | Lubricating condition | Thinnest portion Ra1 | Lower end portion Ra2 | Ra2/Ra1 |
|---|---|---|---|---|---|
| 3 | coated with diamond | solid lubricant (dry lubrication system) | 0.046 μm | 0.078 μm | 1.68 |
| 4 | coated with diamond | no lubricant (dry non-lubrication system) | 0.048 μm | 0.048 μm | 0.99 |

According to Table 3, in the middle stage of work when the ironing is executed severely, the surface roughness Ra1 at the thinnest portion of the body portion is nearly the same between the lubrication system using the solid lubricant and the non-lubrication system using no lubricant. In the initial stage of the ironing work, however, the surface roughness Ra2 at the lower end portion of the body portion differs greatly between the lubrication system using the solid lubricant and the non-lubrication system using no lubricant. Namely, the ratio Ra2/Ra2 is nearly 1.0 in the non-lubrication system whereas the ratio Ra2/Ra2 becomes great in the lubrication system. That is, even in case the total amount of the lubricant is small, the lubricant is brought in much at the start of the work causing, therefore, the surface roughness to increase and developing unhomogeneous metallic luster. By executing the work based on the non-lubrication system that would never bring in the lubricant, on the other hand, it is allowed to achieve a homogeneous metallic luster from the start of the work until the end of the work.

From the above Experimental Examples, the ironing work must be executed under the dry condition to realize a high degree of metallic luster in the thinnest portion of the body portion of the blank cans that occupy a majority proportion of the products and to produce the blank cans having a high commercial value. For this purpose, the ironing dies must have a smooth diamond film on at least the surfaces thereof that come in contact with the material. Besides, to realize a homogeneous metallic luster from the lower end to the upper end of the blank can, the ironing work must be executed based on the non-lubrication system under the dry condition without quite using the lubricant.

It will be learned from the above results that the aluminum can of the present invention has a small difference between a value ($C_h$) of saturation in the body portion measured from the light reflected in the direction of height (axial direction of the can) and a value ($C_w$) of saturation in the body portion measured from the light reflected in the circumferential direction. The aluminum can of the invention, further, suppresses the anisotropy in the brilliancy and features excellently brilliant appearance. Moreover, upon lowering the value (L) of lightness (brightness) that is measured and increasing the light component that is regularly reflected, there is realized an improved degree of metallic luster maintaining stability and further improved appearance due to brilliance and metallic luster in combination.

BRIEF DESCRIPTION OF REFERENCE NUMERALS

11: blank sheet
13: disk
19: drawn can
30: base body of aluminum can (blank can)
31: ironing punch
33: ironing dies
50: blank can
51: body portion
53: bottom portion

The invention claimed is:
1. A drawn and ironed aluminum can wherein:
an outer surface of the can is not coated with resin;
a maximum height of roughness Rz1 (JIS-B-0601-2001) in a circumferential direction is not more than 0.5 μm on an outer surface of a thinnest portion of a body portion, wherein the thinnest portion of the body portion is a region where the thickness is equal to or greater than a smallest thickness of the body portion minus 5 μm and less than or equal to the smallest thickness of the body portion plus 5 μm; and
wherein when a light reflected by an outer surface of the body portion of the drawn and ironed aluminum can is evaluated based on a LCH method using a multi-angle spectral colorimeter, the drawn and ironed aluminum can features a ratio $C_{15h}/C_{15w}$ of 0.6 to 1.4, the ratio $C_{15h}/C_{15w}$ being that of a saturation value $C_{15h}$ of the light reflected at 15 degrees in the direction of height based on the light regularly reflected from the light that is incident at 45 degrees in the direction of height and in the circumferential direction, and a saturation value $C_{15w}$ of the light reflected at 15 degrees in the circumferential direction based on the light regularly reflected from the light that is incident at 45 degrees in the direction of height and in the circumferential direction, wherein as viewed on the side surface, a ratio Ra1/Ra2 is 0.8 to 1.2, the ratio Ra1/Ra2 being that of a mean surface roughness Ra1 in the circumferential direction on the outer surface of the thinnest portion of the body portion and a mean surface roughness Ra2 in the circumferential direction on the outer surface of a lower end portion of the body portion, wherein said lower end portion of the body portion is a region between a lower end of the body portion and a portion 3 mm higher than the lower end of the body portion, wherein the mean surface roughness values Ra1 and Ra2 in the circumferential direction are measured in compliance with JIS-B-0601-2001.

2. The drawn and ironed aluminum can according to claim 1, wherein the saturation value $C_{15h}$ of the light reflected at 15 degrees in the direction of height based on the light regularly reflected from the light that is incident at 45 degrees in the direction of height and in the circumferential direction, is not less than 8.

3. The drawn and ironed aluminum can according to claim 2, wherein a ratio $C_{25h}/C_{25w}$ is 0.6 to 1.4, the ratio $C_{25h}/C_{25w}$ being that of a saturation value $C_{25h}$ of the light reflected at 25 degrees in the direction of height based on the light regularly reflected from the light that is incident at 45 degrees in the direction of height and in the circumferential direction, and a saturation value $C_{25w}$ of the light reflected at 25 degrees in the circumferential direction based on the light regularly reflected from the light that is incident at 45 degrees in the direction of height and in the circumferential direction.

4. The drawn and ironed aluminum can according to claim 3, wherein a lightness value $L_{15h}$ of the light reflected at 15 degrees in the direction of height based on the light regularly reflected from the light that is incident at 45 degrees in the direction of height and in the circumferential direction, and a lightness value $L_{15w}$ of the light reflected at 15 degrees in the circumferential direction based on the light regularly reflected from the light that is incident at 45 degrees in the direction of height and in the circumferential direction, are both not more than 75.

5. The drawn and ironed aluminum can according to claim 4, wherein the lightness value $L_{15h}$ of the light reflected at 15 degrees in the direction of height based on the light regularly reflected from the light that is incident at 45 degrees in the direction of height and in the circumferential direction is not more than 50.

6. The drawn and ironed aluminum can according to claim 1, prepared by executing ironing work under a dry condition using a diamond-coated ironing die having a surface roughness Ra of not more than 0.1 µm and in the absence of a wet lubricant or coolant.

7. The drawn and ironed aluminum can according to claim 1, prepared by executing ironing work under a dry condition using a diamond-coated ironing die having a surface roughness Ra of not more than 0.1 µm and in the absence of a lubricant or coolant.

* * * * *